US012687734B2

(12) United States Patent
Shepherd et al.

(10) Patent No.: US 12,687,734 B2
(45) Date of Patent: Jul. 21, 2026

(54) LIGHT PROJECTOR MODULE

(71) Applicant: TriLite Technologies GmbH, Vienna (AT)

(72) Inventors: John Nicholas Shepherd, Vienna (AT); Zhe Chen, Vienna (AT); Michael Schoeffmann, Baden (AT); Louahab Noui, East Sussex (GB); Joerg Reitterer, Brunn am Gebirge (AT)

(73) Assignee: TriLite Technologies GmbH, Vienna (AT)

( * ) Notice: Subject to any disclaimer, the term of this patent is extended or adjusted under 35 U.S.C. 154(b) by 285 days.

(21) Appl. No.: 18/517,391

(22) Filed: Nov. 22, 2023

(65) Prior Publication Data

US 2024/0168305 A1 May 23, 2024

(30) Foreign Application Priority Data

Nov. 22, 2022 (EP) .................................... 22208848

(51) Int. Cl.
*G02B 27/14* (2006.01)
*G02B 26/08* (2006.01)
*G02B 27/01* (2006.01)

(52) U.S. Cl.
CPC ....... *G02B 27/145* (2013.01); *G02B 26/0833* (2013.01); *G02B 27/0172* (2013.01); *G02B 27/141* (2013.01); *G02B 2027/0178* (2013.01)

(58) Field of Classification Search
CPC .............. G02B 27/145; G02B 26/0833; G02B 27/0172; G02B 27/141; G02B 2027/0178;
(Continued)

(56) References Cited

U.S. PATENT DOCUMENTS

2011/0317235 A1* 12/2011 Desai ................... G02B 26/105
359/212.1
2017/0299956 A1 10/2017 Holland et al.
(Continued)

FOREIGN PATENT DOCUMENTS

DE 102018205148 A1 10/2019
EP 4092471 A1 11/2022
(Continued)

OTHER PUBLICATIONS

Extended European Search Report received for European Patent Application No. 22208848.6, mailed on May 16, 2023, 10 pages.
(Continued)

*Primary Examiner* — Mariam Qureshi
(74) *Attorney, Agent, or Firm* — Weaver IP L.L.C.

(57) ABSTRACT

A light projector module comprises a base plate with two opposite sides both extending in a longitudinal and a transverse direction, a light source mounted on one side of the two opposite sides for transmitting a light beam in a transmission plane that is perpendicular to the two opposite sides and parallel to the longitudinal direction, a micro-electro-mechanical-system (MEMS) scanning assembly having an arm which is mounted on and extends from the other side of the two opposite sides and having a scanning mirror which is movably mounted on the arm for scanning the light beam over a display area, and a light guide mounted on the base plate or the arm for guiding the light beam from the light source towards the scanning mirror. The light guide is configured to guide the light beam in a guiding plane that is parallel to the longitudinal direction.

21 Claims, 4 Drawing Sheets

Figure 1:
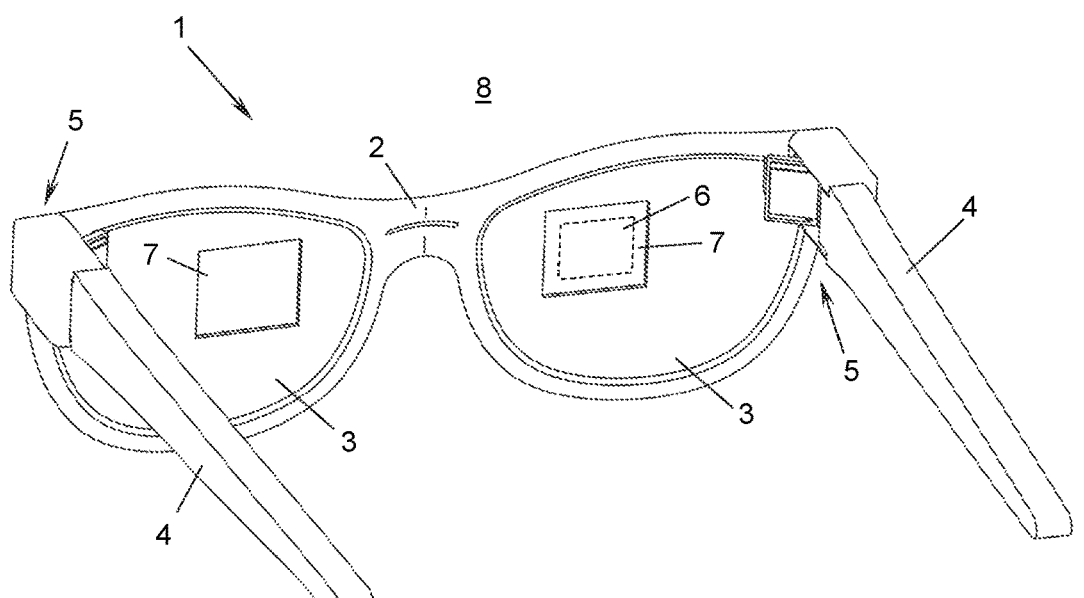

(58) Field of Classification Search
CPC .... G02B 27/14; G02B 27/104; G02B 26/101;
G02B 26/0858; G02B 27/0176; G02B
2027/0154; H04N 9/3129; H04N 9/3173;
H04N 9/3144; H04N 9/3152; G03B
21/008; G03B 21/142; G03B 21/206;
G03B 21/2066
See application file for complete search history.

(56)  References Cited

U.S. PATENT DOCUMENTS

| | | | |
|---|---|---|---|
| 2019/0171091 A1 | 6/2019 | Motobayashi et al. | |
| 2021/0400244 A1* | 12/2021 | Katsuyama | ........ G02B 6/12007 |
| 2022/0206289 A1 | 6/2022 | Ito et al. | |

FOREIGN PATENT DOCUMENTS

| | | | |
|---|---|---|---|
| EP | 4092477 A1 | 11/2022 |
| WO | 2020/088535 A1 | 5/2020 |
| WO | 2023/280497 A1 | 1/2023 |

OTHER PUBLICATIONS

Communication pursuant to Article 94(3) EPC received for European Patent Application No. 22208848.6, mailed on Aug. 25, 2025, 8 pages.

Communication pursuant to Rule 114(2) EPC received for European Patent Application No. 22208848.6, mailed on Jun. 7, 2024, 34 pages.

\* cited by examiner

LIGHT PROJECTOR MODULE

CROSS-REFERENCE TO RELATED APPLICATIONS

This application claims priority to European Patent Application No. 22 208 848.6 filed Nov. 22, 2022, the disclosure of which is incorporated herein by reference.

TECHNICAL FIELD

The present disclosed subject matter relates to a light projector module.

Light projector modules are commonly used in virtual reality (VR) or augmented reality (AR) glasses, helmets or head-up displays for a broad range of applications like navigation, training, entertainment, education or work. A light source transmits a single or multi coloured (e.g. red, green, blue) light beam carrying an image comprised of pixels onto a moving micro-electro-mechanical-system (MEMS) scanning mirror which deflects the light beam into subsequent directions (angles), one direction (angle) per pixel of the image. For example, the MEMS scanning mirror oscillates fast about a vertical axis and slowly about a horizontal axis to sweep the directions and, thus, scan the light beam over the pixels of a display area column by column and row by row.

BACKGROUND

In VR applications, the display area is typically a (miniature) reflective screen in front of the user's eye. In AR applications the display area is a semi-transparent combiner which redirects the light beam towards the user's eye while concurrently superposing it with light field from a surrounding. In either case the cornea and the lens of the user's eye focus the light beam from a specific direction onto one image point on the retina, so that all image points on the retina then form the image perceived by the user. In head mounted displays the light projector may even project the scanned light beam directly into the user's eye, without any reflective screen or semi-transparent combiner. In general video beamer applications the light projector module can be used to project an image onto an external screen like a reflective wall or movie screen.

For light projector modules used in VR or AR glasses, helmets and other head-mounted displays it is desirable to mount the light projector module at a distance as close to the display area as possible, be it a semitransparent combiner, miniature screen or the user's eye, to give the user a field of view as large as possible. In existing art light projector modules, however, the mounting distance has a lower limit due to the modules' internal design. To obtain a larger field of view and, hence, larger image either additional optics or a larger light projector module had to be used which, however, was bulky and heavy for the wearer.

In the applicant's earlier filed, but later published, application EP 4 092 471 A1 a compact and lightweight light projector module has been disclosed that allows for a mounting close to the display array but still leaves room for improvement.

BRIEF SUMMARY

It is an object of the present disclosed subject matter to improve the state of the art and to provide a light projector module which can be mounted as close as possible to a display area to maximize the field of view and image for the user and at the same time is compact and lightweight for maximum wearer comfort.

This object is achieved with a light projector module, comprising:

a base plate with two opposite sides both extending in a longitudinal and a transverse direction, a light source mounted on one side of the two opposite sides for transmitting a light beam in a transmission plane that is perpendicular to the two opposite sides and parallel to the longitudinal direction, a micro-electro-mechanical-system (MEMS) scanning assembly having an arm which is mounted on and extends from the other side of the two opposite sides and having a scanning mirror which is movably mounted on the arm for scanning the light beam over a display area, and a light guide mounted on the base plate or the arm for guiding the light beam from the light source towards the scanning mirror, wherein the light guide is configured to guide the light beam in a guiding plane that is parallel to the longitudinal direction.

By positioning the light source and lens set on one side and the MEMS scanning assembly on the other side of the base plate, with a light guide guiding the light beam from the lens set to the scanning mirror of the MEMS scanning assembly, and by putting the scanning mirror on an arm extending from the other side of the base plate, the scanning mirror—which projects the light beam and hence the output image of the module—can be mounted close to any desired display area, be it a semitransparent combiner, a reflective (miniature) screen or even directly the user's eye.

Guiding the light beam within one single guiding plane parallel to the longitudinal direction is particularly advantageous. Firstly, the light guide can have a small extension in the transverse direction enabling a particularly narrow design of the entire light projection module. Secondly, the light beam can reach the scanning mirror with only a small number of required deflections allowing for a simple and compact light guide and, surprisingly, for mounting the scanning mirror particularly close to the display area. Thirdly, due to the small number of required light beam deflections any polarisation of the light beam (if purposely polarised) can be easily preserved throughout the light guide. Consequently, a very compact and lightweight light projector module with a large field of view and preserved light beam polarisation is created which can be unobtrusively integrated into any head-mounted ("wearable") display device, e.g., into a temple or the frame of VR or AR glasses, for maximum wearer comfort.

For minimizing the extension of the light guide in transverse direction the guiding plane is optionally perpendicular to said two opposite sides. In this way the light guide may transversely be as small as the diameter of the light beam to guide the same towards the scanning mirror.

The light beam may be guided towards the scanning mirror via any number of deflections, e.g. via one single deflection by a single mirror, deflecting the light beam along an L- or V-shaped beam path around the longitudinal end of the base plate. In a favourable embodiment, however, the light guide has a first mirror surface facing said one side of the base plate and a second mirror surface facing said other side of the base plate for guiding the light beam along a C-shaped light path in the guiding plane. Thereby, with two successive reflections at the first and second mirror surfaces, the light guide folds the light beam around the longitudinal end of the base plate in a space-saving manner. The light guide and the scanning mirror can thus be accommodated within a small space at this longitudinal end and the scanning mirror can be particularly close to the display area.

In a further embodiment employing said two mirror surfaces, the light guide optionally comprises an optical guiding prism and said first and second mirror surfaces are formed by prism surfaces of the guiding prism. Hence, the first and second mirror surfaces can be mounted easily as parts of a single component (the guiding prism) on the base plate and are, by design, permanently and exactly aligned with one another.

Optionally, the first mirror surface faces said one side of the base plate under an angle $\alpha$ smaller than 60°, optionally in a range from 20° to 40°, further optionally of about 30°. This allows for a "low" first mirror surface, i.e. a mirror surface having a small height above said one side of the base plate. Moreover, in combination with said guiding prism such an angle $\alpha$ allows, for a variety of materials, to guide the light beam inside the guiding prism by means of total internal reflection (TIR).

When the second mirror surface additionally faces said other side of the base plate under an angle $\beta$ larger than $120°-2\cdot\alpha$, optionally in a range from 80° to 100°, further optionally of about 90°, the scanning mirror can be placed particularly close to the display area and scan a wide range of directions (angles). Moreover, in combination with said guiding prism such an angle $\beta$ allows to guide the light beam by means of a further total internal reflection.

When the arm and said other side of the base plate additionally enclose an angle $\gamma$ in a range from $290°-2\cdot(\alpha+\beta)$ to $340°-2\cdot(\alpha+\beta)$, optionally in a range from 10° to 90°, further optionally in a range from 50° to 70°, the angle of incidence onto the scanning mirror (in its resting position) is in the range from 20° to 70°. Such an angle of incidence is, on the one hand, sufficiently large to achieve a large field of view and, on the other hand, sufficiently small to avoid grazing angles of incidence in operation of the scanning mirror, which may cause unwanted large variations of the diameter of the scanned light beam due to the so-called cosine effect.

For the projection of colour images the light source may be configured to emit a first, a second and a third partial light beam each of a different wavelength, which partial light beams are mutually spaced in the transverse direction, and may include a beam combiner to combine the first, second and third partial light beams into said light beam.

Optionally, the beam combiner has a first section with a first reflective surface for diverting the first partial light beam in the transverse direction towards the second partial light beam and a first wavelength-selective surface which is reflective for the diverted first partial light beam and transmissive for the second partial light beam for co-linearly combining the diverted first and the second partial light beams into an intermediate light beam, and a second section with a second reflective surface for diverting the third partial light beam in the transverse direction towards the intermediate light beam and a second wavelength-selective surface which is reflective for the diverted third partial light beam and transmissive for the intermediate light beam for co-linearly combining the diverted third partial light beam and the intermediate light beam into said light beam. In this way, the partial light beams can be combined within a small transverse space such that the beam combiner may have a particularly small extension in the transverse direction. Moreover, by impinging on one and the same first wavelength-selective mirror the first and second partial light beams can be particularly exactly aligned as can the intermediate light beam (including the first and second partial light beam) and the third partial light beam by impinging on one and the same second wavelength-selective mirror.

Favourably, the light source is configured to emit the second partial light beam between the first and third partial light beams. Hence, the second partial light beam, the light guide and the scanning mirror may be transversely centred and the light projector module may have a particularly small extension in the transverse direction.

It is beneficial when the light source is configured to emit each of the first, second and third partial light beams in a respective plane parallel to the transmission plane, optionally in the longitudinal direction, and wherein each of said reflective and wavelength-selective surfaces is slanted at an angle of 45° with respect to both the longitudinal and the transverse direction. Thereby, the beam combiner can have a particularly small extension in the longitudinal direction. In addition, the second light beam traverses the beam combiner without any deflection and may thus be particularly simply and exactly combined and aligned with the other partial light beams.

In another optional embodiment the second wavelength-selective surface is partially reflective for the intermediate light beam and partially transmissive for the third partial light beam for coupling out a part of each of the first, second and third partial light beams onto a light sensor. This light sensor which is placed in a space-saving manner behind the second wavelength-selective mirror when seen from the third partial light beam allows to survey and calibrate the image light beam.

For an eased manufacture of the light projector module the first and second reflective surfaces and the first and second wavelength-selective surfaces may be formed by coatings on selected prism sides of a set of optical prisms which are joined to a block. By providing the reflective and wavelength-selective surfaces on a single block of joined optical prisms these surfaces are, by design, permanently and exactly aligned with another and can be easily mounted on the base plate.

In a favourable variant employing said block of prisms each of the first, second and third partial light beams enters the block perpendicularly to that side of the block where it enters. Thus, a refraction of the partial light beams upon entering the block can be avoided and the mutual alignment and any optional polarization of the partial light beams can be easily maintained. Similarly, it is favourable when the light beam exits the block perpendicularly to that side of the block where it exits to avoid its refraction upon exiting the block.

In further, optionally combinable, embodiments the beam combiner may combine more than three partial light beams into the light beam. In one embodiment the light source is configured to emit a fourth partial light beam, which is of a different wavelength and mutually spaced in the transverse direction with respect to the first, second and third partial light beams, the beam combiner has a third reflective surface for diverting the fourth partial light beam in the transverse direction towards the first partial light beam, the first reflective surface is a wavelength-selective surface which is reflective for the first partial light beam and transmissive for the diverted fourth partial light beam for co-linearly combining the first and fourth partial light beams, the first wavelength-selective surface is reflective also for the fourth partial light beam, and the second wavelength-selective surface is transmissive also for the fourth partial light beam. Thereby, the first reflective surface and the first and second wavelength-selective surfaces are co-used for the fourth partial light beam, keeping the number of components and the required space for the beam combiner small.

In another embodiment the light source is configured to emit a fifth partial light beam, which is of a different wavelength and mutually spaced in the transverse direction with respect to the first, second and third partial light beams, the beam combiner has a fourth reflective surface for diverting the fifth partial light beam in the transverse direction towards the third partial light beam, the second reflective surface is a wavelength-selective surface which is reflective for the third partial light beam and transmissive for the diverted fifth partial light beam for co-linearly combining the third and fifth partial light beams, and the second wavelength-selective surface is reflective also for the fifth partial light beam. Similarly, in this embodiment the second reflective surface and the second wavelength-selective surface are co-used for the fifth partial light beam to keep the number of components and the required space for the beam combiner small.

BRIEF DESCRIPTION OF THE DRAWINGS/FIGURES

Figure 5:
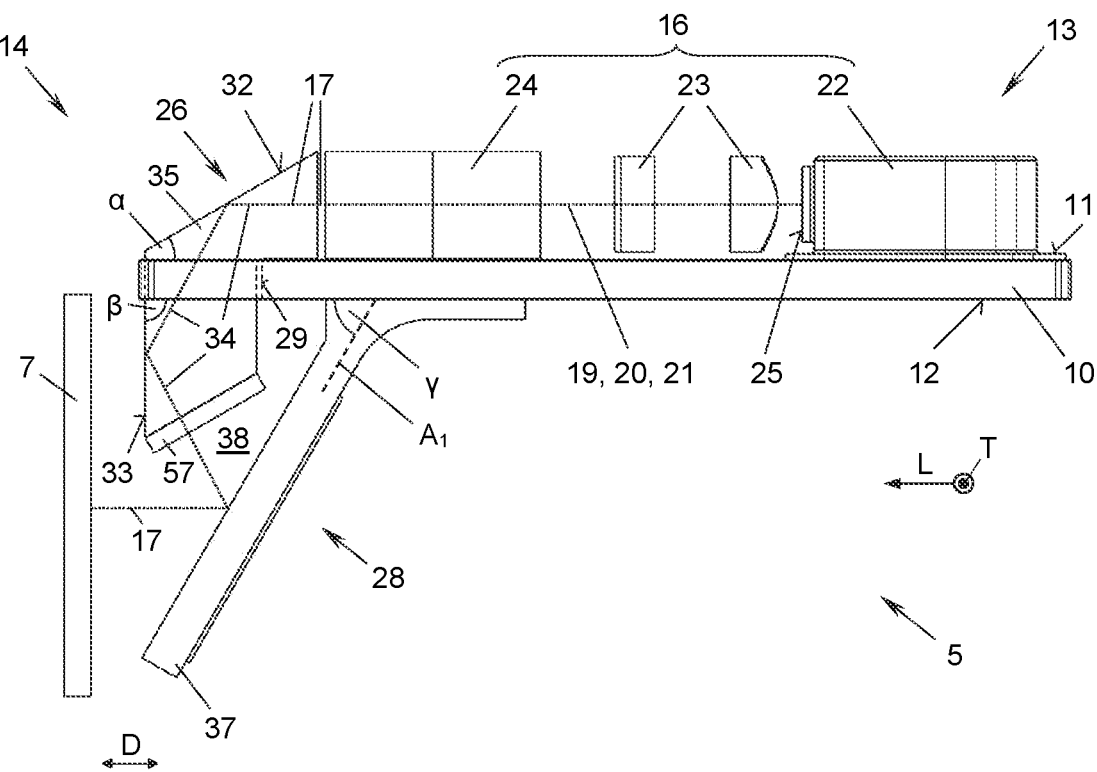
Figure 6:
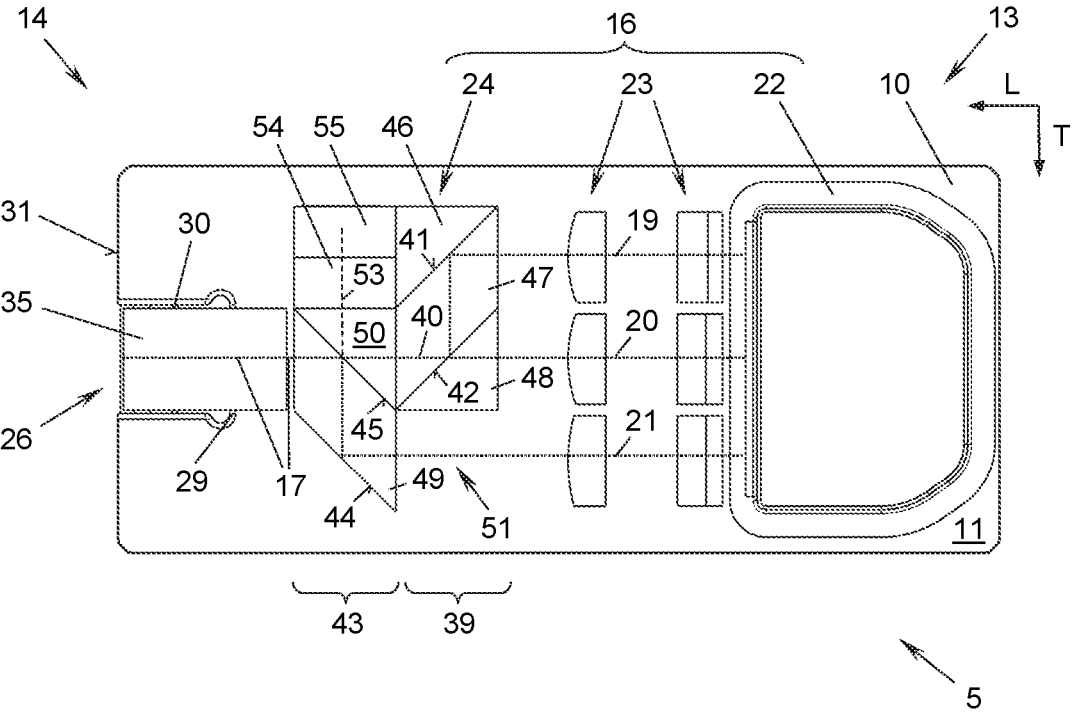
Figure 7:
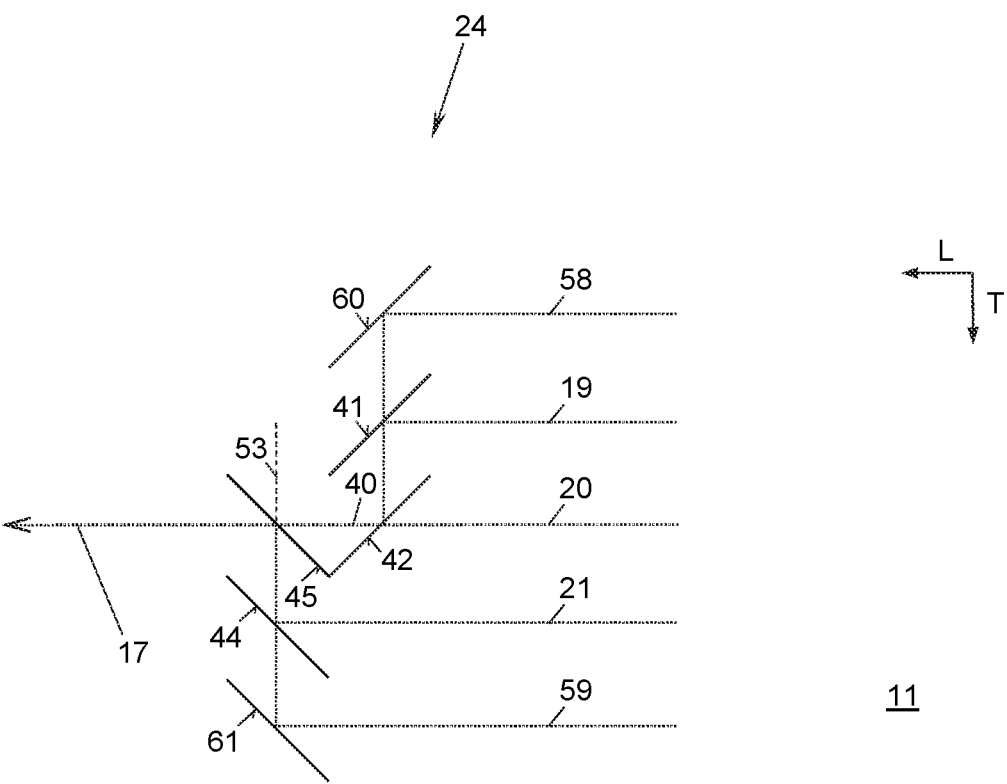

The disclosed subject matter will now be described by means of exemplary embodiments thereof with reference to the enclosed drawings, in which show:

FIG. 1 the light projector module of the disclosed subject matter integrated into a pair of AR glasses in a perspective view;

FIGS. 2-6 the light projector module of the disclosed subject matter in a bottom perspective view (FIG. 2), in a fragmentary top perspective view (FIG. 3), in a fragmentary front perspective view (FIG. 4), in a fragmentary side view in front of an eye glass (FIG. 5), and in a fragmentary top view (FIG. 6), respectively; and FIG. 7 a further embodiment of the beam combiner of the light projector module of FIGS. 1-6.

DETAILED DESCRIPTION

FIG. 1 shows a pair of augmented reality (AR) glasses 1 comprising a spectacle frame 2, a pair of eye glasses 3 and a pair of temples 4. Attached to each temple 4 is a light projector module 5 which projects an image 6 onto a semi-transparent combiner 7. The semi-transparent combiner 7 is supported by the spectacle frame 2 or an eyeglass 3 or integrated into the latter. The semi-transparent combiner 7, e.g., a waveguide or a holographic combiner, superposes the image 6 projected by the light projector module 5 with a light field from a surrounding 8 so that the wearer of the AR glasses 1 can see the image 6 overlaying ("augmenting") the surrounding 8.

The image 6 can, e.g., be monochromatic or coloured, a single image or part of a video sequence of images. The image/s 6 can augment any surrounding 8 such as a landscape, an urban environment, a road, a classroom, a workplace etc. so that the user can perceive additional information, e.g., for navigation, work, education, training or entertainment as an overlay ("AR image") of the light field ("view") of the surrounding 8.

In the example of FIG. 1, the light projector module 5 (here: two modules 5, one per temple 4) is built into AR glasses and used in combination with a semi-transparent combiner 7. A similar application of the light projector module 5 could be in an AR helmet worn by a user, a handheld AR device like a smartphone with a camera, or an AR head-up display for a vehicle which all use a semi-transparent combiner 7 as the display area of the light projector module 5. If desired, suitable relay optics can be interposed between the light projector module 5 and the semi-transparent combiner 7.

Instead of the semi-transparent combiner 7 the light projector module 5 could be used with any other display area, e.g., a conventional reflective projection screen such as a miniature screen mounted on the frame 2 of virtual reality (VR) glasses, or a projection wall or a movie screen, for example when the light projector module 5 is used as a miniature (or full-scale) video beamer. The light projector module 5 could even be used to directly project the image 6 directly into the user's eye, optionally with suitable optics therebetween.

The light projector module 5 can be built into a separate housing (not shown) or be directly integrated into the spectacle frame 2 or one of its temples 4, i.e., use the spectacle frame 2 or a temple 4 as its housing. For ease of representation, FIGS. 2-6 show the light projector module 5 without housing. It goes without saying that the light projector module 5 will usually have some sort of protective housing which may include a transparent cover, window or dome on its image projecting side for mechanical and dust protection.

Referring to FIGS. 2-6, the light projector module 5 has a base plate 10 with two opposite sides 11, 12, which both extend in a longitudinal direction L and a transverse direction T, a rear end 13 and a front end 14. The base plate 10 can support a printed circuit board (PCB) 15 at its rear end 13 or be a PCB itself. For better heat dissipation, the base plate 10 is optionally made of a thermally conductive material such as aluminium, steel or another metal or, if the base plate 10 is a PCB itself, may have appropriately metallized areas and/or thermal ducts.

On its one side 11 the base plate 10 mounts a light source 16 which transmits a light beam 17 in a transmission plane 18 that is perpendicular to the sides 11, 12 and parallel to the longitudinal direction L, i.e. the transmission plane 18 is perpendicular to the transverse direction T. In the embodiment shown the light source 16 transmits the light beam 17 optionally parallel to the longitudinal direction L, i.e. parallel to the side 11. Moreover, here the light source 16 transmits a three-coloured light beam 17 which is a combination of three partial light beams 19, 20, 21 of different wavelengths. To this end, the light source 16 has a light emitting element 22 emitting the partial light beams 19-21, optional collimating lenses 23 collimating each of the partial light beams 19-21, and an optional combiner 24 co-linearly combining the partial light beams 19-21 into the light beam 17.

For a full colour image 6 three partial light beams 19-21 of the primary colours red, green and blue are used, as known in the art. For displaying a mono- or bicoloured image 6, only one or two partial light beams may be employed. For improving image quality also more than three partial light beams 19-21 of the primary colours red, green and blue can be used. To add further functionalities such as sensing, light beams with invisible wavelengths, e.g., infra-red or ultra-violet, can be integrated as well.

The light beam 17 usually carries the image 6 in a time-multiplexed manner, i.e., the intensity values of the image pixels one after the other, e.g., column-by-column and row-by-row per image 6 comprised of a grid of pixels, and image-by-image per video comprised of a sequence of images 6.

The light emitting element 22 can be of any kind including gas lasers, fibre lasers, semiconductor lasers etc. For miniaturisation the light emitting element 22 may employ LEDs, micro LEDs or laser diodes, e.g., edge-emitting laser diodes or surface-emitting laser diodes, one per partial light beam 19-21.

The partial light beams 19-21 exit the light emitting element 22 on a front side 25 thereof and are mutually spaced in the transverse direction T. The partial light beams 19-21 may exit the side 25 at different positions, under different angles and different mutual spacings. In the shown example, the partial light beams 19-21 are parallel to each other and lie in a common plane which runs parallel to and at a distance from the one side 11 of the base plate 10. This is not obligatory but makes it easier to combine the different light beams 19-21 into the single light beam 17, as will be explained later on.

Downstream of the light source 16 the light beam 17 enters a light guide 26 which guides the light beam 17 in a single guiding plane 27 parallel to the longitudinal direction L to a micro-electro-mechanical system (MEMS) scanning assembly 28 on the other side 12 of the base plate 10. The light guide 26 guides the light beam 17 from the one side 11 to the other side 12 around a transverse edge 29 of the base plate 10. To this end, the light guide 26 may pass through the front end 14 or pass ("wrap") around the transverse edge 29 from the one side 11 to the other side 12. In the embodiment shown the guiding plane 27 is additionally—which is not obligatory—perpendicular to the sides 11, 12 such that the transmission and guiding planes 18, 27 coincide and the light beam 17 is guided from the light source 16 to the MEMS scanning assembly 28 in a single plane 18, 27 (coinciding with the drawing plane in FIG. 5) and will, thus, only require a small number of beam deflections. Alternatively, the planes 18 and 27 may not coincide, e.g. when the MEMS scanning assembly 28 shall be offset from the light source 16 in transversal direction T.

It shall be noted that the light beam 17 has actually a certain beam diameter which has been neglected for the sake of simplicity so far. Thus, when the light beam 17 is transmitted and guided within the transmission and guiding planes 18, 27, it is understood that actually its geometrical centre, centre of gravity with respect to intensity, etc. is within that plane.

The light guide 26 may be mounted on the base plate 10. In the present example the light guide 26 passes through a cut-out 30 in the front end 14 of the base plate 10. In embodiments without the cut-out 30, the light guide 26 may pass around the longitudinally ultimate transverse edge 31 of the front end 14. Should the light beam 17 exit the light source 16 under an angle that lets the light beam 17 pass through or by the base plate 10, that section of the light beam 17 where it passes from one side 11 to the other side 12 of the base plate 10 is part of the light guide 26.

In general, the light guide 26 may comprise any number of beam deflecting elements such as mirrors, deflection prisms etc. to guide the light beam 17 within the guiding plane 27, e.g. a single deflecting element guiding the light beam 17 along an L- or V-shaped light path in the guiding plane 27. In the present example the light guide 26 comprises as beam deflecting elements a first mirror surface 32 which faces the side 11 under an angle α of 30° and a second mirror surface 33 which faces the side 12 under an angle β of 90°. The mirror surfaces 32, 33 are arranged to guide, by means of only two successive reflections, the light beam 17 along a C-shaped light path 34 in the guiding plane 27.

The mirror surfaces 32, 33 may be any surfaces achieving reflections of the light beam 17, e.g. coated surfaces. In the embodiment shown the mirror surfaces 32, 33 are formed by prism sides of an optical guiding prism 35 passing through the cut-out 30 and the angles α and β are chosen to achieve a total internal reflection, TIR. To this end, the angle α may, in general, be smaller than 60°, e.g. in the range from 20° to 40°, and the angle β may, in general, be larger than 120°−2·α, e.g. in the range from 80° to 100°.

The MEMS scanning assembly 28 is configured to scan the light beam 17 received from the light source 16 via the light guide 26 over the desired display area, e.g., the semi-transparent combiner 7 of the AR glasses 1, a reflective screen in front of the light projector module 5, or even directly the user's eye via optional optics. For example, the MEMS scanning assembly 28 scans the light beam 17 column by column and/or row by row over the display area to project the image 6 pixel by pixel according to image pixel information modulated onto the light beam 17.

Figure 3:
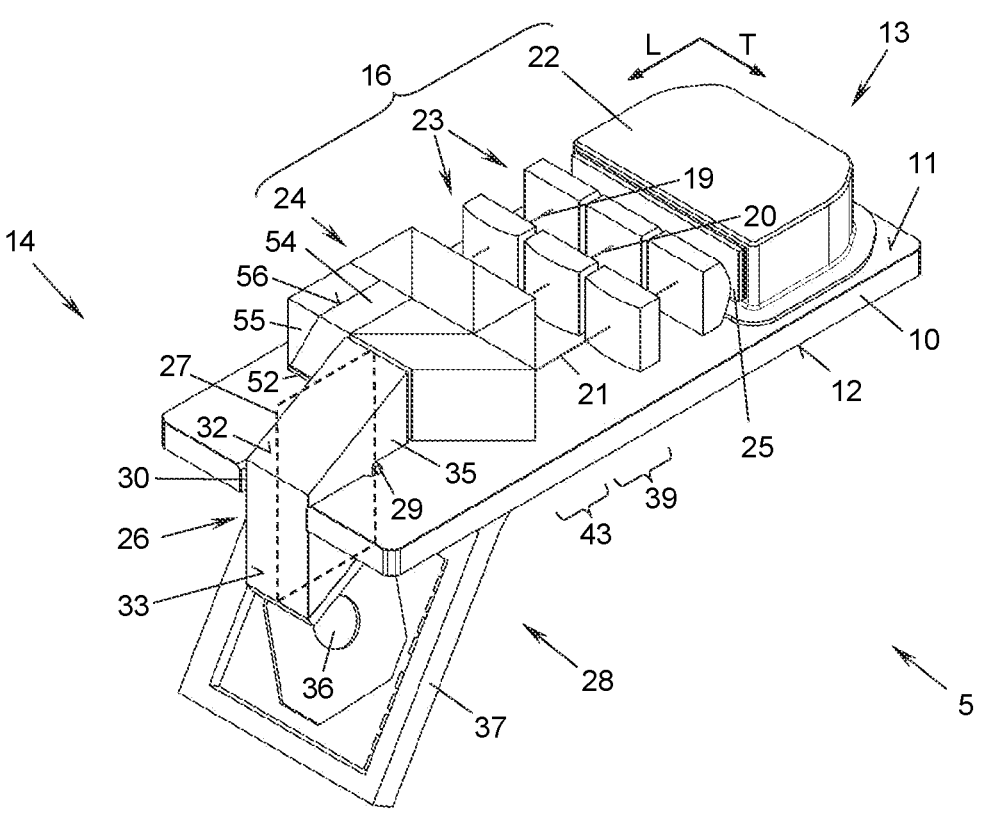
Figure 4:
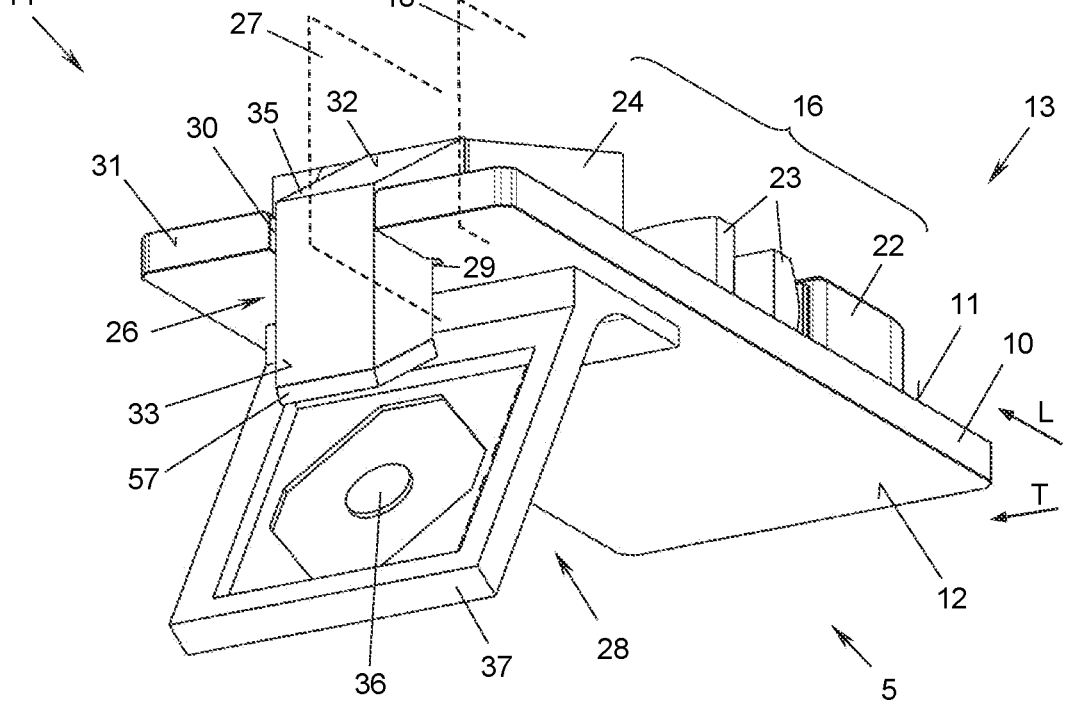

As shown in FIGS. 3 to 5, the MEMS scanning assembly 28 has a scanning mirror 36 movably mounted on an arm 37 which extends from the other side 12 of the base plate 10. The longitudinal axis of the arm 37, i.e., its axis of extension from the base plate 10, is denoted with $A_1$. The scanning mirror 36 is mounted pivotably about one or optionally two perpendicular axes of pivot on the arm 37 and oscillates about those axis/axes under the agitation of electromechanical, electrostatic or piezoelectric actuators controlled by driving electronics (not shown). The driving electronics may be connected via a flexible printed circuit (FPC) or ribbon cable to the PCB 15 of the base plate 10.

To scan the light beam 17 two-dimensionally over the display area the scanning mirror 36 needs to oscillate about two perpendicular axes of pivot; alternatively, two scanning mirrors 36 each oscillating about a different axis of pivot and working in cascade could be mounted on the arm 37.

The arm 37 may be used to mount the light guide 26 in addition or alternatively to the base plate 10.

As shown in FIG. 5 the arm 37 extends under an angle γ, measured at the front end 14 between its axis of extension $A_1$ and the longitudinal direction from the other side 12 of the base plate 10 so that the active (reflecting) side of the scanning mirror 36 faces the base plate 10 under that angle γ when the scanning mirror 36 is at rest; when it oscillates, the facing angle will vary accordingly. The angle γ can be in the range from 290°−2·(α+β) to 340°−2·(α+β), e.g. in the range from 10°-90°, particularly from 50°-70°, for instance about 60° as shown in FIG. 5.

The arm 37 is as close as possible to the front end 14 of the base plate 10 so that the light projector module 5 can be placed at a minimized distance D from the desired display area, e.g., the semi-transparent combiner 7, a projection screen or the user's eye, to maximize the user's field of view. When a semi-transparent combiner 7 in form of a waveguide is used, the reduction of the distance D has the further benefit that the footprint of the light beam 17 at the input coupler of the waveguide is reduced, which in turn reduces adverse interactions within the waveguide and the input coupler. As a consequence, a more efficient and more uniform image 6 is presented to the user at the output of the waveguide.

The arm 37 originates at the side 12 from a point close to that point where the light guide 26 exits. In this way, the arm 37 encloses with the front end section of the base plate 10 a small wedge-shaped space 38. This space 38 can conveniently be used to accommodate the end of the guiding prism 35.

The Y- or bifurcate shape of the front section of the light projector module 5 formed by the arm 37 and the front end section of the base plate 10 allows the light beam 17 to impinge on the scanning mirror 36 on its side facing the exit of the light guide 26 while concurrently allowing the scanned light beam 17 to leave the scanning mirror 36 unhindered in the desired projection direction. This allows the light projector model 5 to be integrated, e.g., in the corner area of the temple 4 of the spectacle frame 2 with a minimum distance D to the semi-transparent combiner 7 or a projection screen mounted in front of the user's eye.

Figure 2:
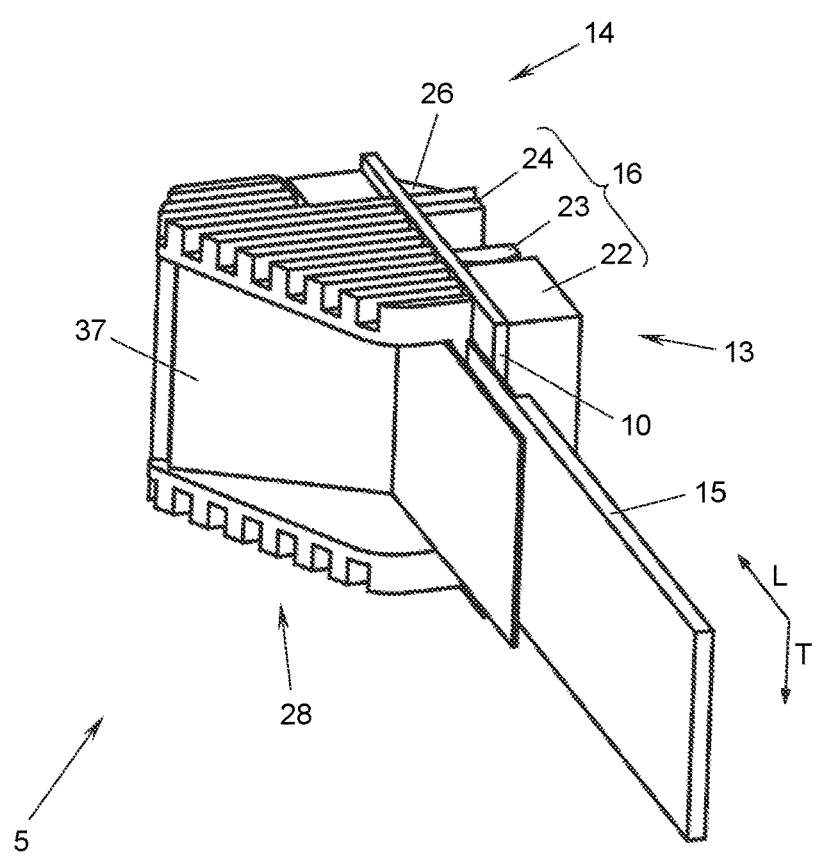

The arm 37 can, e.g., be formed by one or more struts on the rear side and/or on one or more lateral sides of the scanning mirror 36 and/or by a frame enclosing the scanning mirror 36 as shown in FIGS. 2-4. The arm 37 could also be a flat plate which supports the scanning mirror 36 on its side facing the base plate 10.

With reference to FIGS. 3 and 6, details on combining the partial light beams 19-21 into the light beam 17 by means of the beam combiner 24 will be described. As can be seen therein, the beam combiner 24 has a first section 39 for combining the partial light beams 19 and 20 into an intermediate light beam 40. The first section 39 has a first reflective surface 41 which diverts the partial light beam 19 in the transverse direction T towards the partial light beam 20 (in FIG. 6: downwards), and a first wavelength-selective surface 42 which is reflective for the diverted partial light beam 19 and transmissive for the partial light beam 20 and arranged to co-linearly (in FIG. 6: parallel to the longitudinal direction L) combine the diverted partial light beam 19 and the partial light beam 20 into the intermediate light beam 40. Similarly, the beam combiner 24 has a second section 43 for combining the partial light beam 21 and the intermediate light beam 40 into the image light beam 17. The second section 43 has a second reflective surface 44 which diverts the partial light beam 21 in the transverse direction T towards the intermediate light beam 40 (in FIG. 6: upwards) and a second wavelength-selective surface 45 which is reflective for the diverted partial light beam 21 and transmissive for the intermediate light beam 40 to co-linearly (in FIG. 6: parallel to the longitudinal direction L) combine the diverted partial light beam 21 and the intermediate light beam 40 into the light beam 17.

The reflective surfaces 41, 44 may be formed by any type of mirrors, reflective coatings, surfaces reflecting by TIR, etc. The wavelength-selective surfaces 42 and 45 may be made of any wavelength-selective material or coated therewith. In alternative embodiments one ore more of the surfaces 41, 42, 44 and 45 may be formed by separate, free-standing components.

The sections 39 and 43, their surfaces 41, 42, 44 and 45, and the partial light beams 19-21 can be arranged in many ways as long as the partial light beams 19-21 are co-linearly combined into the light beam 17. For instance, the sections 39 and 43 may alternatively be exchanged in the longitudinal direction L, be shifted in the transverse direction T and/or mirrored when seen in the longitudinal direction L. Consequently, instead of the central partial light beam 20 which is emitted between the other partial light beams 19, 21, one of the other (in FIG. 6: the upper or lower one) partial light beams 19, 21 may only traverse the wavelength-selective surfaces 42 and 45 and, hence, optionally remain non-diverted. Moreover, the shown emission of the partial light beams 19-21 parallel to the longitudinal direction L and the slanting of the surfaces 41, 42, 44 and 45 at an angle of 45° with respect to the longitudinal direction L and the transverse direction T are merely optional. In alternative embodiments, the partial light beams 19-21 may be emitted in other directions within a plane parallel to the transmission plane 18, i.e. at an angle with respect to the side 11. In further alternative embodiments, at least one of the partial light beams 19-21 may be emitted in a direction with a component in the transverse direction T. Of course, the orientations of the surfaces 41, 42, 44 and 45 will then be adapted thereto in order to combine the partial light beams 19-21 into the light beam 17 to be transmitted in the transmission plane 18.

For an easy-to-mount realisation of the sections 39 and 43, the beam combiner 24 optionally comprises a set of optical prisms 46-50 which are joined to a block 51 and some of whose prism surfaces are coated to form the surfaces 41, 42, 44 and 45. To avoid unnecessary beam deflections upon entering the block 51, the partial light beams 19-21 enter the block 51 perpendicularly to the block's sides where they enter, i.e. the prisms 47, 48 and 49 face their respective entering partial light beam 19-21 perpendicularly. For the same reason, the prism 50 faces the entering intermediate light beam 40 perpendicularly. To avoid an unnecessary beam deflection upon exiting the block 51, the image light beam 17 exits the block 51 perpendicularly to the block's side where it exits, i.e. the prism 49 faces the exiting light beam 17 perpendicularly.

Referring to FIGS. 3 and 6, an optional light sensor 52 may be mounted in a space-saving manner behind the second reflective surface 45 by coupling out a part 53 of the partial light beams 19-21 there. For this purpose, the second reflective surface 45 can, on the one hand, be partially reflective for the intermediate light beam 40 to partially couple out the partial light beams 19 and 20 and, on the other hand, be partially transmissive for the third partial light beam 21 to partially couple it out. As a result, the image light beam 17 can be surveyed and calibrated, e.g. by a control unit connected to the light sensor 52 and the light emitting element 22.

The light sensor 52 can, e.g., be mounted at the underside of optical prisms 54, 55 which supplement the block 51 and provide a further reflective surface 56 deflecting the part 53 down to the light sensor 52.

Optionally, for polarisation control, one or more wave plates could be arranged in the path of the light beam 17, e.g. between the guiding prism 35 and the MEMS scanning assembly 28, see waveplate 57 at the exit side of the guiding prism 35, or between the guiding prism 35 and the light source 16, or in the light path of some or all of the partial light beams 19-21. Instead of or in addition to such a wave plate one or more optical attenuators could be included, too. Such attenuators could be put anywhere in the path of the light beams 17, 19-21, e.g., at the location described above for the wave plate/s. For example, such attenuator/s could be combined with the wave plate/s or integrated therein.

FIG. 7 schematically depicts a further embodiment of the beam combiner 24 which combines more than said three partial light beams 19-21 into the light beam 17. To this end, two further partial light beams 58, 59 with further different wavelengths, e.g. in the infrared spectrum or of additional colours like cyan, magenta and yellow, are emitted by the light emitting element 22. The further partial light beams 58, 59 are diverted by respective reflective surfaces 60, 61 towards the partial light beam 20, here: the partial light beam 58 downwards towards the partial light beam 19 and the partial light beam 59 upwards towards the partial light beam 21. The diverted further partial light beams 58, 59 are then co-linearly combined with the partial light beams 19 and 21 by the reflective surfaces 41 and 44, respectively, and with the partial light beam 20 by the wavelength selective surfaces 42, 45 as described above for the partial light beams 19 and 21.

Similar to the example of FIG. 6, in the embodiment of FIG. 7 the wavelength selective surface 42 is transmissive for the partial light beam 20 and reflective for the partial light beams 19 and 58, the wavelength selective surface 45 is transmissive for the intermediate light beam 40 (here: also including the partial light beam 58) and reflective for the partial light beams 21 and 59, the reflective surface 41 is a wavelength-selective surface which is reflective for the partial light beam 19 and transmissive for the partial light beam 58 to combine the partial light beams 19 and 58, and the reflective surface 44 is a wavelength-selective surface which is reflective for the partial light beam 21 and transmissive for the partial light beam 59 to combine the partial light beams 21 and 59.

If the optional light sensor 52 is employed, the coupled-out part 53 may also include a part of the partial light beam 58 and/or 59 when the surface 45 is partially reflective also for the partial light beam 58 and/or partially transmissive also for the partial light beam 59.

Of course, the beam combining concept shown in FIG. 6 for three partial light beams and in FIG. 7 for five partial light beams can be expanded to any number of partial light beams by adding further reflective and wavelength-selective surfaces according to the exemplary expansion from FIG. 6 to FIG. 7.

The disclosed subject matter is not restricted to the specific embodiments described in detail herein, but encompasses all variants, modifications and combinations thereof that fall within the scope of the appended claims.

What is claimed is:

1. A light projector module, comprising:
a base plate with two opposite sides both extending in a longitudinal and a transverse direction,
a light source mounted on one side of the two opposite sides of the base plate for transmitting a light beam in a transmission plane that is perpendicular to the two opposite sides of the base plate and parallel to the longitudinal direction,
a micro-electro-mechanical-system (MEMS) scanning assembly having an arm which is mounted on and extends from the other side of the two opposite sides of the base plate and having a scanning mirror which is movably mounted on the arm for scanning the light beam over a display area, and
a light guide mounted on the base plate or the arm for guiding the light beam from the light source on said one side of the two opposite sides of the base plate towards the scanning mirror on said other side of the two opposite sides of the base plate,
wherein the light guide is configured to guide the light beam in a guiding plane that is parallel to the longitudinal direction.

2. The light projector module according to claim 1, wherein the guiding plane is perpendicular to the two opposite sides.

3. The light projector module according to claim 1, wherein the light guide has a first mirror surface facing said one side of the base plate and a second mirror surface facing said other side of the base plate for guiding the light beam from the light source on said one side of the two opposite sides of the base plate to the scanning mirror on said other side of the two opposite sides of the base plate with two successive reflections along a C-shaped light path in the guiding plane.

4. The light projector module according to claim 3, wherein the first mirror surface faces said one side of the base plate under an angle α in a range from 20° to 40°.

5. The light projector module according to claim 3, wherein the light guide comprises an optical guiding prism and said first and second mirror surfaces are formed by prism surfaces of the guiding prism.

6. The light projector module according to claim 3, wherein the first mirror surface faces said one side of the base plate under an angle α smaller than 60°.

7. The light projector module according to claim 6, wherein the second mirror surface faces said other side of the base plate under an angle β in a range from 80° to 100°.

8. The light projector module according to claim 6, wherein the second mirror surface faces said other side of the base plate under an angle β larger than 120°−2·α.

9. The light projector module according to claim 8, wherein the arm and said other side of the base plate enclose an angle γ in a range from 10° to 90°.

10. The light projector module according to claim 8, wherein the arm and said other side of the base plate enclose an angle γ in a range from 290°−2·(α+β) to 340°−2·(α+β).

11. The light projector module according to claim 1, wherein the light source is configured to emit a first, a second and a third partial light beam each of a different wavelength, which partial light beams are mutually spaced in the transverse direction, and includes a beam combiner to combine the first, second and third partial light beams into said light beam.

12. A light projector module, comprising:
a base plate with two opposite sides both extending in a longitudinal and a transverse direction,
a light source mounted on one side of the two opposite sides for transmitting a light beam in a transmission plane that is perpendicular to the two opposite sides and parallel to the longitudinal direction,
a micro-electro-mechanical-system (MEMS) scanning assembly having an arm which is mounted on and extends from the other side of the two opposite sides and having a scanning mirror which is movably mounted on the arm for scanning the light beam over a display area, and
a light guide mounted on the base plate or the arm for guiding the light beam from the light source towards the scanning mirror,
wherein the light guide is configured to guide the light beam in a guiding plane that is parallel to the longitudinal direction,
wherein the light source is configured to emit a first, a second and a third partial light beam each of a different wavelength, which partial light beams are mutually spaced in the transverse direction, and includes a beam combiner to combine the first, second and third partial light beams into said light beam, and
wherein the beam combiner has
a first section with a first reflective surface for diverting the first partial light beam in the transverse direction towards the second partial light beam and a first wavelength-selective surface which is reflective for the diverted first partial light beam and transmissive for the second partial light beam for co-linearly combining the diverted first and the second partial light beams into an intermediate light beam, and
a second section with a second reflective surface for diverting the third partial light beam in the transverse direction towards the intermediate light beam and a second wavelength-selective surface which is reflective for the diverted third partial light beam and transmissive for the intermediate light beam for co-linearly combining the diverted third partial light beam and the intermediate light beam into said light beam.

13. The light projector module according to claim 11, wherein the light source is configured to emit the second partial light beam between the first and third partial light beams.

14. The light projector module according to claim 12, wherein the light source is configured to emit each of the first, second and third partial light beams in a respective plane parallel to the transmission plane, and wherein each of said reflective and wavelength-selective surfaces is slanted at an angle of 45° with respect to both the longitudinal and the transverse direction.

15. The light projector module according to claim 14, wherein the light source is configured to emit each of the first, second and third partial light beams in the longitudinal direction.

16. The light projector module according to claim 12, wherein the second wavelength- selective surface is partially reflective for the intermediate light beam and partially transmissive for the third partial light beam for coupling out a part of each of the first, second and third partial light beams onto a light sensor.

17. The light projector module according to claim 12, wherein the first and second reflective surfaces and the first and second wavelength-selective surfaces are formed by coatings on selected prism sides of a set of optical prisms which are joined to a block.

18. The light projector module according to claim 17, wherein each of the first, second and third partial light beams enters the block perpendicularly to that side of the block where it enters.

19. The light projector module according to claim 17, wherein the light beam exits the block perpendicularly to that side of the block where it exits.

20. The light projector module according to claim 12, wherein the light source is configured to emit a fourth partial light beam, which is of a different wavelength and mutually spaced in the transverse direction with respect to the first, second and third partial light beams, wherein the beam combiner has a third reflective surface for diverting the fourth partial light beam in the transverse direction towards the first partial light beam, and wherein the first reflective surface is a wavelength-selective surface which is reflective for the first partial light beam and transmissive for the diverted fourth partial light beam for co-linearly combining the first and fourth partial light beams, the first wavelength-selective surface is reflective also for the fourth partial light beam, and the second wavelength-selective surface is transmissive also for the fourth partial light beam.

21. The light projector module according to claim 12, wherein the light source is configured to emit a fifth partial light beam, which is of a different wavelength and mutually spaced in the transverse direction with respect to the first, second and third partial light beams, wherein the beam combiner has a fourth reflective surface for diverting the fifth partial light beam in the transverse direction towards the third partial light beam, and wherein the second reflective surface is a wavelength-selective surface which is reflective for the third partial light beam and transmissive for the diverted fifth partial light beam for co-linearly combining the third and fifth partial light beams, and the second wavelength-selective surface is reflective also for the fifth partial light beam.

* * * * *